US008717606B2

(12) United States Patent
Tanaka

(10) Patent No.: US 8,717,606 B2
(45) Date of Patent: May 6, 2014

(54) COMMUNICATION APPARATUS, COMMUNICATION SYSTEM, AND COMPUTER READABLE MEDIUM

(75) Inventor: Tatsuyuki Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 265 days.

(21) Appl. No.: 13/231,343

(22) Filed: Sep. 13, 2011

(65) Prior Publication Data

US 2012/0170081 A1    Jul. 5, 2012

(30) Foreign Application Priority Data

Jan. 5, 2011   (JP) .................................. 2011-000684

(51) Int. Cl.
*G06F 3/12*      (2006.01)
*H04N 1/00*      (2006.01)
*H04N 1/32*      (2006.01)

(52) U.S. Cl.
USPC .......................... 358/1.15; 358/407; 358/442

(58) Field of Classification Search
USPC ....................................................... 358/407
See application file for complete search history.

(56) References Cited

U.S. PATENT DOCUMENTS

| | | | | |
|---|---|---|---|---|
| 4,213,201 A * | 7/1980 | Gagnier et al. | ............... | 370/220 |
| 5,187,732 A * | 2/1993 | Suzuki | ....................... | 379/22.02 |
| 5,917,615 A * | 6/1999 | Reifman et al. | ............. | 358/468 |
| 6,292,828 B1 * | 9/2001 | Williams | ..................... | 709/218 |
| 6,304,565 B1 * | 10/2001 | Ramamurthy | ................ | 370/352 |
| 6,320,857 B1 * | 11/2001 | Tonnby et al. | ................. | 370/352 |
| 6,636,721 B2 * | 10/2003 | Threadgill et al. | ........... | 455/12.1 |
| 6,771,773 B1 * | 8/2004 | Hanrieder et al. | ....... | 379/413.02 |
| 6,850,497 B1 * | 2/2005 | Sigler et al. | .................. | 370/310 |
| 7,058,175 B2 * | 6/2006 | Hanrieder et al. | ....... | 379/413.02 |
| 7,061,901 B1 * | 6/2006 | Shnitzer et al. | ............... | 370/352 |
| 7,239,629 B1 * | 7/2007 | Olshansky et al. | ........... | 370/353 |
| 7,369,848 B2 * | 5/2008 | Jiang | .......................... | 455/432.3 |
| 7,499,532 B2 * | 3/2009 | Pearson et al. | ............. | 379/90.01 |
| 7,505,769 B2 * | 3/2009 | Jiang | .......................... | 455/432.3 |
| 7,536,437 B2 * | 5/2009 | Zmolek | ......................... | 709/206 |
| 7,577,431 B2 * | 8/2009 | Jiang | .......................... | 455/432.1 |
| 7,688,723 B1 * | 3/2010 | Lo et al. | ........................ | 370/230 |
| 7,751,553 B2 * | 7/2010 | Pearson | ........................ | 379/352 |
| 7,889,854 B2 * | 2/2011 | Kouchri et al. | .......... | 379/211.01 |
| 7,912,464 B2 * | 3/2011 | Jiang | .......................... | 455/432.1 |
| 8,041,335 B2 * | 10/2011 | Khetawat et al. | .......... | 455/404.2 |
| 8,108,516 B2 * | 1/2012 | Zmolek | ......................... | 709/224 |
| 8,312,660 B1 * | 11/2012 | Fujisaki | ........................ | 42/70.11 |
| 8,340,726 B1 * | 12/2012 | Fujisaki | ........................ | 455/566 |

(Continued)

FOREIGN PATENT DOCUMENTS

JP          07-226810 A     8/1995

*Primary Examiner* — Madelein A Nguyen
(74) *Attorney, Agent, or Firm* — Sughrue Mion, PLLC

(57) ABSTRACT

A communication apparatus includes a communication start request receiving unit and a response notification output unit. The communication start request receiving unit receives, via a first communication path, a communication start request that is output from a source communication apparatus and is transmitted via a relay apparatus. The response notification output unit outputs a first response notification or a second response notification to the relay apparatus via the first communication path when the communication start request receiving unit receives, via the first communication path, a communication start request for starting communication using a second communication standard in a case where the number of apparatuses with which the communication apparatus is communicating using the second communication standard has reached a predetermined number. The first response notification indicates that communication is being performed. The second response notification has a lower priority than the first response notification in an arbitration process.

7 Claims, 5 Drawing Sheets

(56) References Cited

U.S. PATENT DOCUMENTS

| | | | |
|---|---|---|---|
| 2001/0036171 A1* | 11/2001 | Tonnby et al. | 370/352 |
| 2002/0087716 A1* | 7/2002 | Mustafa | 709/236 |
| 2002/0196782 A1* | 12/2002 | Furukawa et al. | 370/352 |
| 2003/0154293 A1* | 8/2003 | Zmolek | 709/228 |
| 2005/0036590 A1* | 2/2005 | Pearson et al. | 379/88.16 |
| 2005/0047567 A1* | 3/2005 | Robb et al. | 379/93.32 |
| 2005/0058271 A1* | 3/2005 | Hanrieder et al. | 379/242 |
| 2006/0033809 A1* | 2/2006 | Farley | 348/14.01 |
| 2006/0072552 A1* | 4/2006 | Shnitzer et al. | 370/352 |
| 2006/0109967 A1* | 5/2006 | Kouchri et al. | 379/207.02 |
| 2006/0276226 A1* | 12/2006 | Jiang | 455/558 |
| 2007/0274467 A1* | 11/2007 | Pearson | 379/67.1 |
| 2008/0002709 A1* | 1/2008 | Kennedy et al. | 370/395.1 |
| 2008/0192736 A1* | 8/2008 | Jabri et al. | 370/352 |
| 2008/0293408 A1* | 11/2008 | Jiang | 455/433 |
| 2009/0024601 A1* | 1/2009 | Zmolek | 707/4 |
| 2010/0048197 A1* | 2/2010 | Jiang | 455/422.1 |

\* cited by examiner

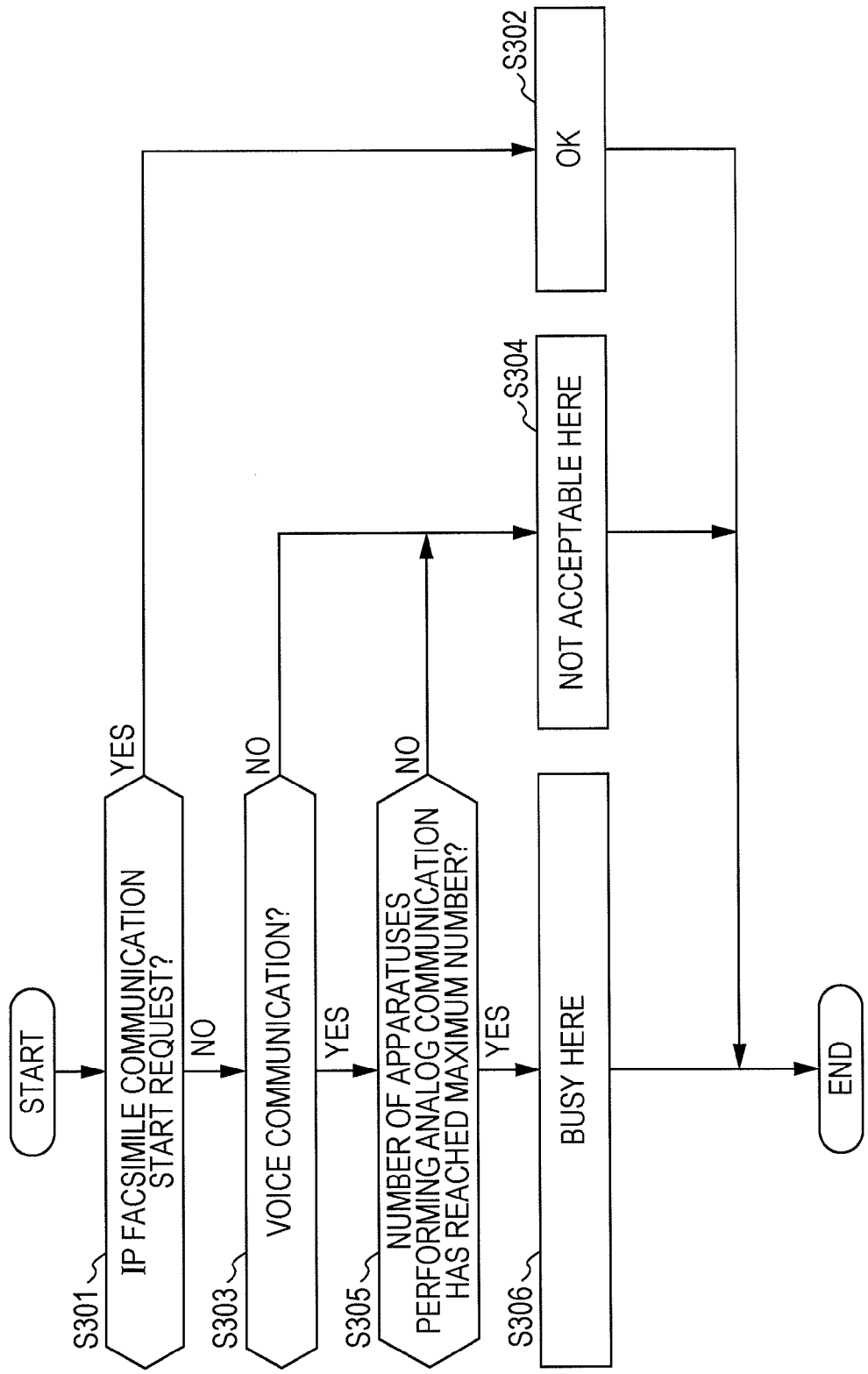

COMMUNICATION APPARATUS, COMMUNICATION SYSTEM, AND COMPUTER READABLE MEDIUM

CROSS-REFERENCE TO RELATED APPLICATIONS

This application is based on and claims priority under 35 USC 119 from Japanese Patent Application No. 2011-000684 filed Jan. 5, 2011.

BACKGROUND (i) Technical Field

The present invention relates to a communication apparatus, a communication system, and a computer readable medium.

(ii) Related Art

Internet protocol (IP) facsimile apparatuses that perform digital communication of image information using an IP are available. Some of the IP facsimile apparatuses are capable of performing not only digital communication of image information using an IP but also analog communication of image information via a public switched telephone network (PSTN). Such an IP facsimile apparatus is provided with not only a communication interface compatible with an IP, such as a local area network (LAN) card, but also a communication interface compatible with a PSTN, such as an analog facsimile communication card.

In recent years, communication between facsimile apparatuses using a next-generation network (NGN) has become prevalent. An NGN is an infrastructure network for providing a new information communication service, in which fixed terminal communication and mobile communication are combined, and also telephone communication, data communication, and streaming broadcasting are combined. As an apparatus for relaying communication between the NGN and an IP facsimile apparatus, a relay apparatus such as a home gateway apparatus may be used.

In a case where a relay apparatus such as a home gateway apparatus relays communication between an NGN and an IP facsimile apparatus, an optical fiber connected to the NGN is connected to a corresponding port of the relay apparatus in a typical case. Also, a LAN cable connected to a LAN card provided in the IP facsimile apparatus and a modular cable connected to an analog facsimile communication card provided in the IP facsimile apparatus are connected to corresponding ports of the relay apparatus, respectively.

Typically, when an analog facsimile apparatus connected to a PSTN and an IP facsimile apparatus connected to an NGN perform communication with each other under the situation in which the NGN is connected to the PSTN, analog-to-digital conversion or digital-to-analog conversion is performed by an apparatus that connects the NGN and the PSTN (hereinafter referred to as a network connection apparatus) or a relay apparatus. For example, in the case of transmitting a signal to the IP facsimile apparatus connected to the NGN, the network connection apparatus deems the signal output from the analog facsimile apparatus to be a voice signal, and performs digitalization and packetization on the signal. Such a communication scheme is referred to as a deemed voice communication scheme.

In communication using the deemed voice communication scheme between an analog facsimile apparatus connected to a PSTN and an IP facsimile apparatus connected to an NGN, a session initiation protocol (SIP) may be used for starting, changing, or ending the connection between the communication apparatuses. For example, when a request for starting communication using an IP (for example, an INVITE request in the SIP) is transmitted from an analog facsimile apparatus to an IP facsimile apparatus via a PSTN and an NGN, a relay apparatus receives the request at all the ports thereof. Then, when responses from all the ports are obtained, the relay apparatus performs an arbitration process on these responses to determine an SIP response (for example, on the basis of a predetermined priority), and transmits the SIP response to a network connection apparatus. Also, there is a network connection apparatus that converts a received SIP response into a corresponding audio signal and transmits it to an analog facsimile apparatus.

When a request for starting communication using the deemed voice communication scheme is transmitted to an IP facsimile apparatus on a receiver side under the situation in which the number of analog facsimile apparatuses with which the IP facsimile apparatus is performing analog communication has reached a predetermined number, a response indicating refusal of connection (for example, a 488 response in the SIP) may be transmitted from a relay apparatus to a network connection apparatus as a result of an arbitration process of arbitrating between the response indicating refusal of connection from a LAN port of the relay apparatus (for example, a 488 response in the SIP) and a response indicating that communication is being performed from an analog port of the relay apparatus (for example, a 486 response in the SIP). In this case, there is a possibility that the network connection apparatus converts the response indicating refusal of connection (for example, a 488 response in the SIP) into an audio signal that is different from an audio signal indicating that communication is being performed.

SUMMARY

According to an aspect of the invention, there is provided a communication apparatus connected to a relay apparatus via a first communication path and a second communication path. The relay apparatus relays communication performed with a source communication apparatus. The first communication path is used for communication using a first communication standard. The second communication path is used for communication using a second communication standard. The communication apparatus includes a communication start request receiving unit and a response notification output unit. The communication start request receiving unit receives, via the first communication path, a communication start request that is output from the source communication apparatus and is transmitted via the relay apparatus. The response notification output unit outputs a first response notification or a second response notification to the relay apparatus via the first communication path when the communication start request receiving unit receives, via the first communication path, a communication start request for starting communication using the second communication standard in a case where the number of apparatuses with which the communication apparatus is communicating using the second communication standard has reached a predetermined number. The first response notification indicates that communication is being performed. The second response notification has a lower priority than the first response notification in an arbitration process of arbitrating between pieces of information output from the relay apparatus. The arbitration process is executed by the relay apparatus.

BRIEF DESCRIPTION OF THE DRAWINGS

Exemplary embodiment(s) of the present invention will be described in detail based on the following figures, wherein:

FIG. 5 is a flowchart illustrating an example of a process performed by a first communication apparatus according to the exemplary embodiment.

DETAILED DESCRIPTION

Hereinafter, an exemplary embodiment of the present invention will be described in detail with reference to the attached drawings.

Figure 1:
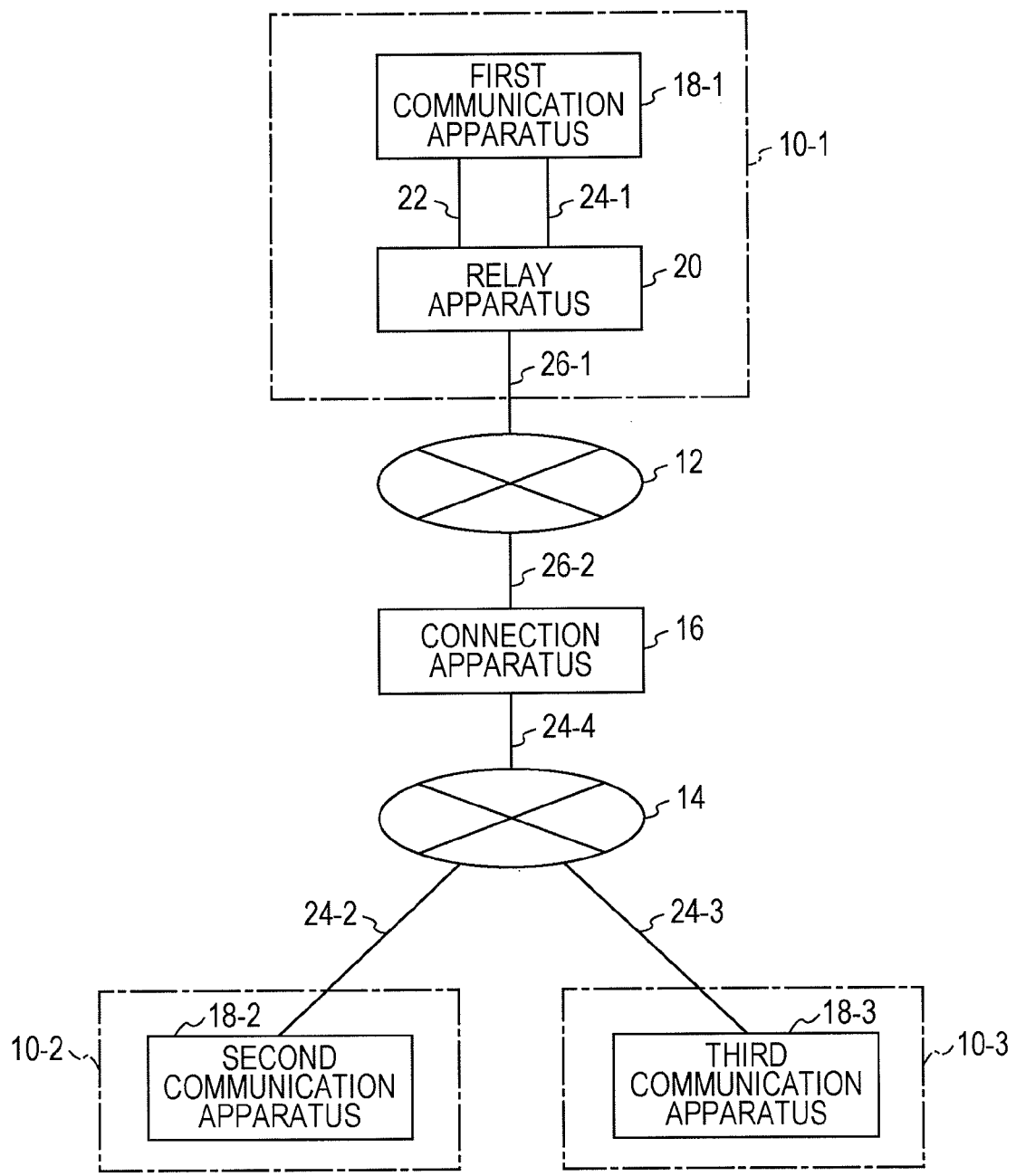
FIG. 1 is a diagram illustrating an example of an entire configuration of a communication system according to an exemplary embodiment of the present invention.

FIG. 1 is a diagram illustrating an example of an entire configuration of a communication system according to the exemplary embodiment. As illustrated in FIG. 1, a first communication section 10-1 according to the exemplary embodiment is connected to a first communication medium (for example, a next-generation network (NGN) 12). Also, a second communication section 10-2 and a third communication section 10-3 are connected to a second communication medium (for example, a public switched telephone network (PSTN) 14). In the exemplary embodiment, the NGN 12 and the PSTN 14 are connected to each other via a connection apparatus 16. Accordingly, in the exemplary embodiment, the first communication section 10-1, the second communication section 10-2, and the third communication section 10-3 communicate with one another. The first communication section 10-1 includes a first communication apparatus 18-1 and a relay apparatus 20. The second communication section 10-2 includes a second communication apparatus 18-2. The third communication section 10-3 includes a third communication apparatus 18-3.

The first communication apparatus 18-1 is an Internet protocol (IP) facsimile apparatus, for example, and includes a controller, a memory, a reading unit, a printing unit, a digital communication unit, and an analog communication unit. The controller is a program control device, such as a central processing unit (CPU), that operates in accordance with a program installed into a communication apparatus 18. The memory is a storage device, such as a read only memory (ROM) or a random access memory (RAM), or a hard disk drive. The reading unit reads an image formed on a surface of a sheet. The printing unit prints an image received from another communication apparatus 18 on a sheet. The digital communication unit is a communication interface for digital communication, such as a local area network (LAN) card. The analog communication unit is a communication interface for analog communication, such as an analog facsimile communication card. These elements are connected to one another via a bus or the like.

The connection apparatus 16 is a PSTN gateway apparatus, for example, and performs conversion between an analog signal and a digital signal (VoIP signal or the like). The second communication apparatus 18-2 and the third communication apparatus 18-3 are analog facsimile apparatuses, for example.

The relay apparatus 20 is a home gateway apparatus that relays communication between the first communication apparatus 18-1 and the NGN 12. The relay apparatus 20 includes a controller, a memory, a first port, a second port, and a third port. The controller is a program control device, such as a CPU, that operates in accordance with a program installed into a communication apparatus 18. The memory is a storage device, such as a ROM or a RAM, or a hard disk drive. The first port is a communication port used for digital communication with a communication apparatus 18. The second port is a communication port used for analog communication with a communication apparatus 18. The third port is a communication port used for digital communication with the NGN 12.

In the exemplary embodiment, the first port of the relay apparatus 20 is connected to the digital communication unit of the first communication apparatus 18-1 via a digital communication cable (for example, a LAN cable 22). The second port of the relay apparatus 20 is connected to the analog communication unit of the first communication apparatus 18-1 via an analog communication cable (for example, a first modular cable 24-1). The third port of the relay apparatus 20 is connected to the NGN 12 via a first optical fiber 26-1, for example.

The PSTN 14 is connected to the second communication apparatus 18-2 and the third communication apparatus 18-3 via respective analog communication cables. Specifically, the PSTN 14 is connected to the second communication apparatus 18-2 via a second modular cable 24-2, and the PSTN 14 is connected to the third communication apparatus 18-3 via a third modular cable 24-3.

Also, in the exemplary embodiment, the NGN 12 is connected to the connection apparatus 16 via a second optical fiber 26-2, and the PSTN 14 is connected to the connection apparatus 16 via a fourth modular cable 24-4.

Figure 2:
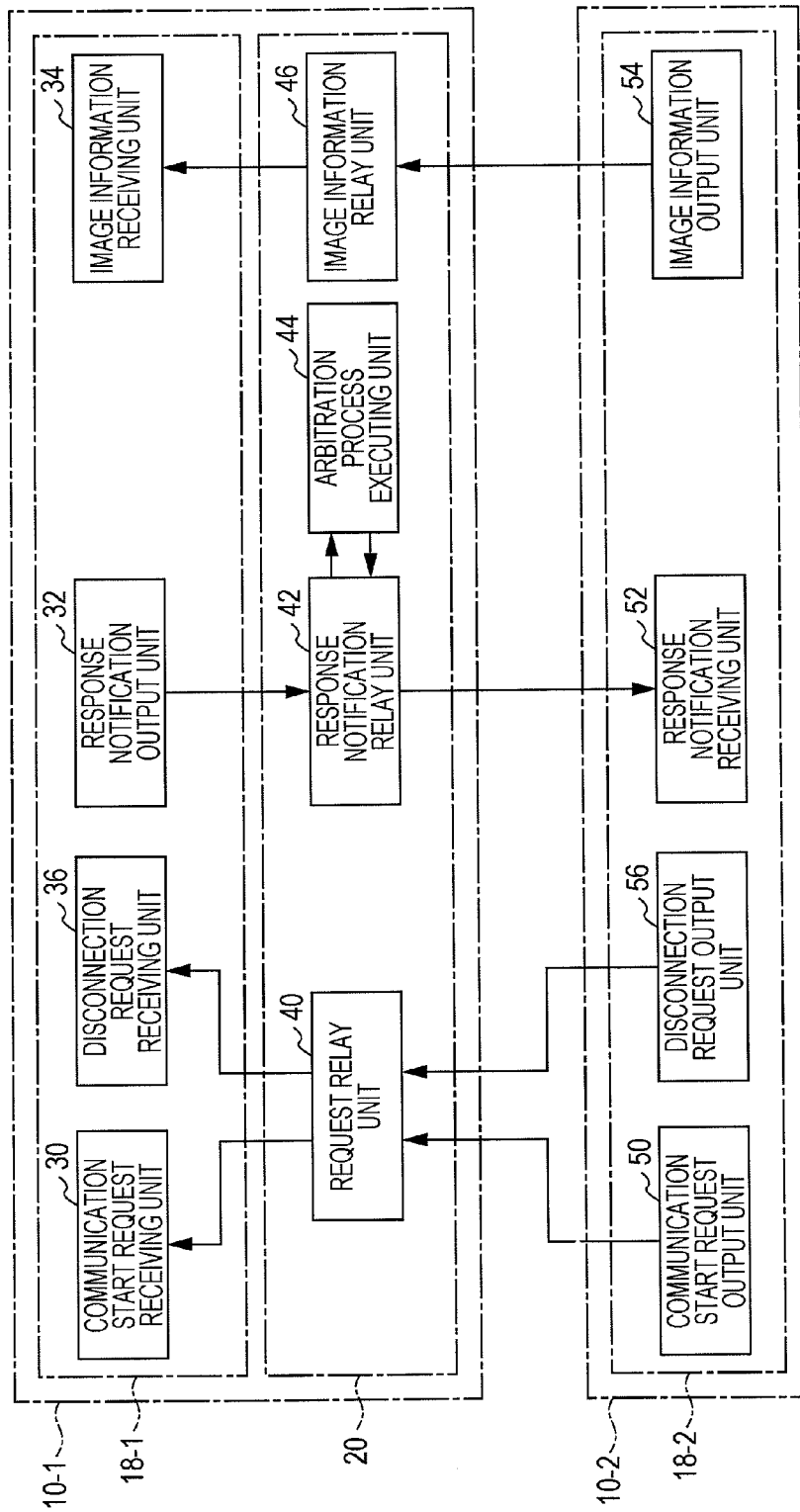
FIG. 2 is a functional block diagram illustrating functions realized by a first communication section and a second communication section according to the exemplary embodiment.

FIG. 2 is a functional block diagram illustrating an example of functions realized by the first communication section 10-1 and the second communication section 10-2 according to the exemplary embodiment. Note that FIG. 2 illustrates only the functions especially related to the description given below. In the first communication section 10-1 according to the exemplary embodiment, functions other than the functions illustrated in FIG. 2 (for example, a function of outputting a communication start request, etc.) are realized. In the second communication section 10-2 according to the exemplary embodiment, functions other than the functions illustrated in FIG. 2 (for example, a function of receiving a communication start request, etc.) are realized. As illustrated in FIG. 2, the first communication apparatus 18-1 includes a communication start request receiving unit 30, a response notification output unit 32, an image information receiving unit 34, and a disconnection request receiving unit 36. The relay apparatus 20 includes a request relay unit 40, a response notification relay unit 42, an arbitration process executing unit 44, and an image information relay unit 46. The second communication apparatus 18-2 includes a communication start request output unit 50, a response notification receiving unit 52, an image information output unit 54, and a disconnection request output unit 56. In the third communication apparatus 18-3 according to the exemplary embodiment, functions similar to the functions realized by the second communication apparatus 18-2 illustrated in FIG. 2 are realized.

These elements are realized by executing, with the controllers of the communication apparatus 18 and the relay apparatus 20 serving as computers, programs installed into the communication apparatus 18 and the relay apparatus 20. The programs are supplied to the communication apparatus 18 and the relay apparatus 20, respectively, via a computer readable information storage medium, such as a compact disc-read only memory (CD-ROM) or a digital versatile disc-read only memory (DVD-ROM), or via a communication medium, such as the Internet.

Figure 3:
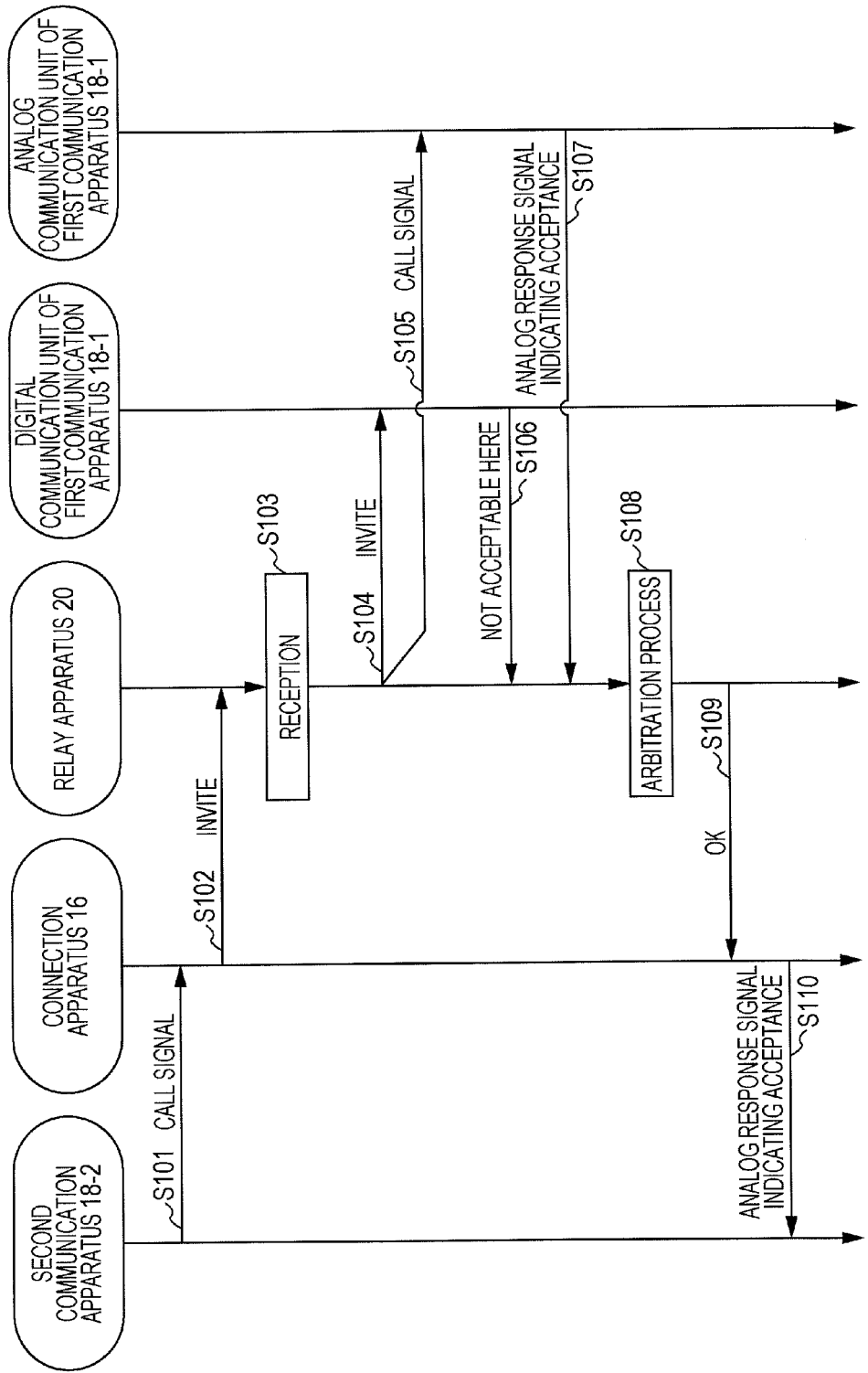
FIG. 3 is a flowchart illustrating an example of a process according to the exemplary embodiment.

Now, an example of a process according to the exemplary embodiment will be described with reference to the flowchart illustrated in FIG. 3. In this example, it is assumed that the second communication apparatus 18-2 transmits a communication start request to the first communication apparatus 18-1 when the first communication apparatus 18-1 is not communicating with the third communication apparatus 18-3.

First, the communication start request output unit 50 of the second communication apparatus 18-2 outputs a communication start request (for example, a call signal) for requesting the first communication apparatus 18-1 to start analog facsimile communication (step S101). Then, the connection apparatus 16 receives the communication start request, converts it into a communication start request that is based on a deemed voice communication scheme using an Internet protocol (for example, an "INVITE" request in a session initiation protocol (SIP)), which corresponds to the received communication start request and which requests start of analog facsimile communication. Then, the connection apparatus 16 outputs the communication start request obtained through the conversion to the relay apparatus 20 (step S102). Accordingly, the request relay unit 40 of the relay apparatus 20 receives the communication start request, and causes the communication start request to be received at the first port and the second port of the relay apparatus 20 (step S103).

Then, the request relay unit 40 of the relay apparatus 20 outputs the communication start request (analog communication start request) received at the first port from the first port to the digital communication unit of the first communication apparatus 18-1 via the LAN cable 22 (step S104). Accordingly, the communication start request receiving unit 30 of the first communication apparatus 18-1 receives the communication start request via the digital communication unit.

Also, the request relay unit 40 of the relay apparatus 20 converts the communication start request received at the second port into an analog signal (for example, a call signal), and outputs the analog signal from the second port of the relay apparatus 20 to the analog communication unit of the first communication apparatus 18-1 via the first modular cable 24-1 (step S105). Accordingly, the communication start request receiving unit 30 of the first communication apparatus 18-1 receives the analog signal via the analog communication unit.

In response to the communication start request received via the digital communication unit, which is an analog communication start request, the response notification output unit 32 of the first communication apparatus 18-1 outputs a response notification indicating refusal of connection (in this example, a notification in which the value of a response code in the SIP is 488 ("Not Acceptable Here")) toward the second communication apparatus 18-2 via the LAN cable 22 (step S106). Accordingly, the response notification relay unit 42 of the relay apparatus 20 receives the response notification from the first port.

On the other hand, in response to the communication start request received via the analog communication unit, the response notification output unit 32 of the first communication apparatus 18-1 outputs an analog response signal indicating acceptance of communication with the second communication apparatus 18-2 toward the second communication apparatus 18-2 via the first modular cable 24-1 (step S107). Accordingly, the response notification relay unit 42 of the relay apparatus 20 receives the analog response signal from the second port, and converts it into a response notification indicating acceptance of communication with the second communication apparatus 18-2 (for example, a definite response notification in which the value of a response code in the SIP is 200 ("OK")).

Then, the arbitration process executing unit 44 of the relay apparatus 20 executes an arbitration process of arbitrating between these two response notifications (the response notification indicating refusal of connection and the response notification indicating acceptance of communication) (step S108). In the exemplary embodiment, the arbitration process executing unit 44 determines that the response notification indicating acceptance of communication has higher priority than the response notification indicating refusal of connection, and instructs the response notification relay unit 42 of the relay apparatus 20 to output the response notification indicating acceptance of communication toward the second communication apparatus 18-2.

Accordingly, the response notification relay unit 42 of the relay apparatus 20 outputs, via the NGN 12 to the connection apparatus 16, the response notification indicating acceptance of communication addressed to the second communication apparatus 18-2 (step S109). Then, the connection apparatus 16 converts the response notification into a corresponding analog response signal and outputs the analog response signal to the second communication apparatus 18-2 via the PSTN 14. Accordingly, the response notification receiving unit 52 of the second communication apparatus 18-2 receives the analog response signal (step S110).

After that, the image information output unit 54 of the second communication apparatus 18-2 outputs, using analog communication, image information to the first communication apparatus 18-1 via the connection apparatus 16 and the image information relay unit 46 of the relay apparatus 20. Accordingly, the image information receiving unit 34 of the first communication apparatus 18-1 receives the image information. In this way, the image information is transmitted from the second communication apparatus 18-2 to the first communication apparatus 18-1.

Then, the disconnection request output unit 56 of the second communication apparatus 18-2 outputs a disconnection request to the first communication apparatus 18-1 via the connection apparatus 16 and the request relay unit 40 of the relay apparatus 20. Accordingly, the disconnection request receiving unit 36 of the first communication apparatus 18-1 receives the disconnection request. Then, the response notification output unit 32 of the first communication apparatus 18-1 outputs a notification indicating disconnection of the line to the second communication apparatus 18-2 via the response notification relay unit 42 of the relay apparatus 20 and the connection apparatus 16. Accordingly, the response notification receiving unit 52 of the second communication apparatus 18-2 receives the notification. In this way, the communication between the first communication apparatus 18-1 and the second communication apparatus 18-2 is disconnected.

Figure 4:
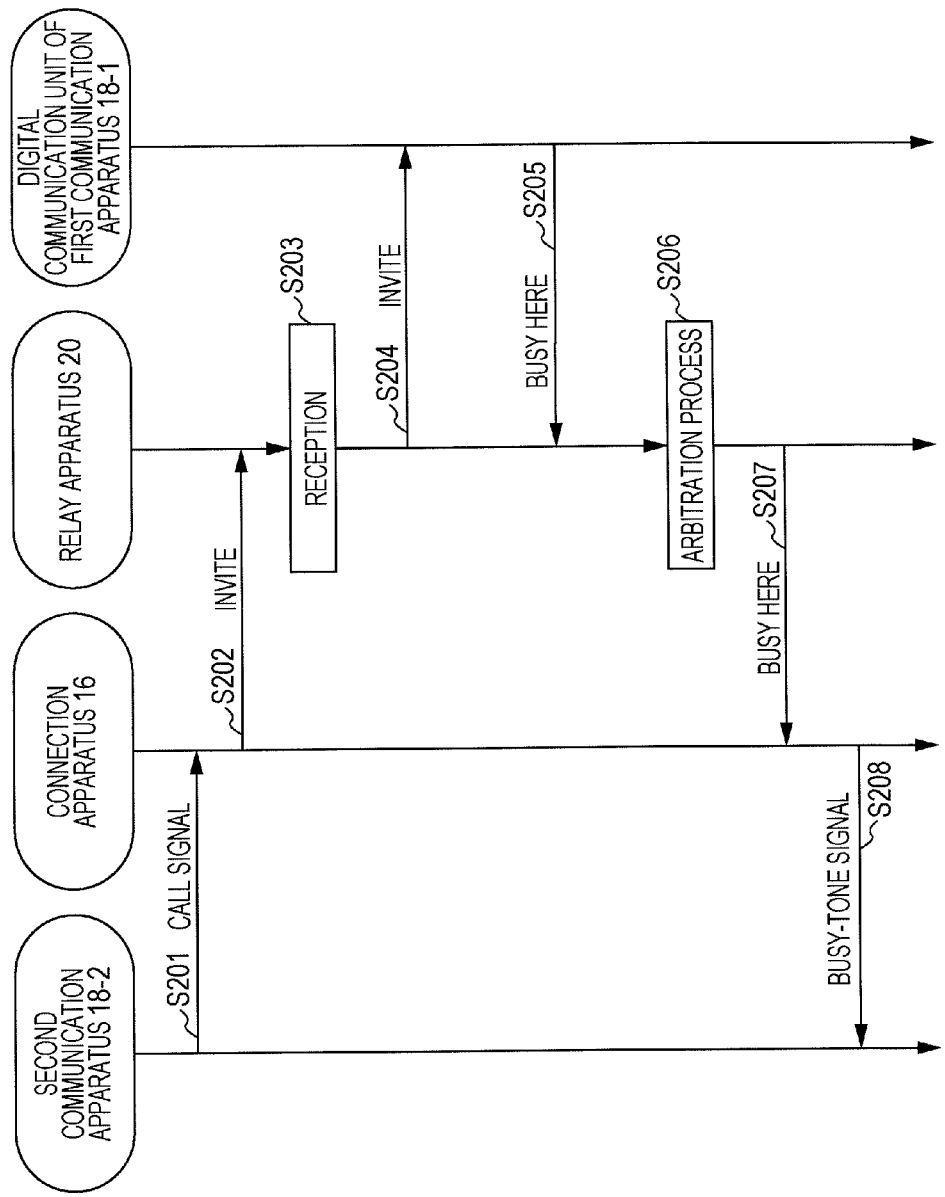
FIG. 4 is a flowchart illustrating another example of the process according to the exemplary embodiment.

Next, another example of the process according to the exemplary embodiment will be described with reference to the flowchart illustrated in FIG. 4. In this example, it is assumed that the second communication apparatus 18-2 transmits a communication start request to the first communication apparatus 18-1 while the first communication apparatus 18-1 is communicating with the third communication apparatus 18-3 in an analog manner. In the exemplary embodiment, it is assumed that the maximum number of apparatuses with which the first communication apparatus 18-1 is capable of communicating at the same time in an analog manner is one.

First, the communication start request output unit 50 of the second communication apparatus 18-2 outputs a communication start request (for example, a call signal) for requesting the first communication apparatus 18-1 to start analog facsimile communication (step S201), as in the foregoing step S101. Then, the connection apparatus 16 receives the communication start request, converts it into a communication start request that is based on a deemed voice communication scheme using an Internet protocol, which requests start of analog facsimile communication. Then, the connection apparatus 16 outputs the communication start request obtained through the conversion to the relay apparatus 20 (step S202), as in the foregoing step S102. Accordingly, the request relay unit 40 of the relay apparatus 20 receives the communication start request, and causes the communication start request to be received at the first port and the second port of the relay apparatus 20 (step S203), as in the foregoing step S103.

Then, the request relay unit 40 of the relay apparatus 20 outputs the communication start request (analog communication start request) received at the first port from the first port to the digital communication unit of the first communication apparatus 18-1 via the LAN cable 22 (step S204). At this time, the second port of the relay apparatus 20 is being used for communication, and thus the second port of the relay apparatus 20 does not output a call signal to the first communication apparatus 18-1 via the first modular cable 24-1, and outputs a response notification indicating that communication is being performed (in this example, a notification in which the value of a response code in the SIP is 486 ("Busy Here")) to the response notification relay unit 42 of the relay apparatus 20.

Then, the communication start request receiving unit 30 of the first communication apparatus 18-1 receives the communication start request output from the first port of the relay apparatus 20. The received communication start request is an analog communication start request, the first communication apparatus 18-1 is communicating with the third communication apparatus 18-3, and the number of apparatuses with which the first communication apparatus 18-1 is communicating in an analog manner has reached the maximum number, so that the response notification output unit 32 of the first communication apparatus 18-1 outputs a response notification indicating that communication is being performed (in this example, a notification in which the value of a response code in the SIP is 486 ("Busy Here")) toward the second communication apparatus 18-2 via the LAN cable 22. Accordingly, the response notification relay unit 42 of the relay apparatus 20 receives the response notification via the first port (step S205).

Then, the arbitration process executing unit 44 of the relay apparatus 20 executes an arbitration process of arbitrating between the response notification that is received by the response notification relay unit 42 from the first port and that indicates that communication is being performed and the response notification that is received by the response notification relay unit 42 from the second port and that indicates that communication is being performed (step S206). In the exemplary embodiment, both the two response notifications indicate that communication is being performed, and thus the arbitration process executing unit 44 instructs the response notification relay unit 42 of the relay apparatus 20 to output, toward the second communication apparatus 18-2, a response notification indicating that communication is being performed.

Accordingly, the response notification relay unit 42 of the relay apparatus 20 outputs, toward the second communication apparatus 18-2, a response notification indicating that communication is being performed to the connection apparatus 16 via the NGN 12 (step S207). Then, the connection apparatus 16 converts the response notification into a corresponding analog response signal (for example, a busy-tone signal), and outputs the analog response signal to the second communication apparatus 18-2 via the PSTN 14. Accordingly, the response notification receiving unit 52 of the second communication apparatus 18-2 receives the analog response signal (step S208).

In this way, in the above-described process, the second communication apparatus 18-2 receives a busy-tone signal.

Hereinafter, a description will be given of an example of a process that is performed when the first communication apparatus 18-1 according to the exemplary embodiment receives a communication start request via the digital communication unit, with reference to the flowchart illustrated in FIG. 5.

First, the response notification output unit 32 of the first communication apparatus 18-1 determines whether or not the received communication start request is an IP facsimile communication start request (step S301). If the received communication start request is an IP facsimile communication start request (YES in step S301), the response notification output unit 32 outputs a response notification indicating acceptance of communication with the apparatus as a source of the communication start request (for example, a definite response notification in which the value of a response code in the SIP is 200 ("OK")) to the relay apparatus 20 via the LAN cable 22 (step S302). Otherwise (NO in step S301), the response notification output unit 32 of the first communication apparatus 18-1 determines whether or not the type of communication requested in the received communication start request is voice communication (whether or not the communication start request is an analog communication start request that is based on a deemed voice communication scheme) (step S303).

If the type of communication is not voice communication (NO in step S303), the response notification output unit 32 of the first communication apparatus 18-1 outputs a response notification indicating refusal of connection (in this example, a notification in which the value of a response code in the SIP is 488 ("Not Acceptable Here")) to the relay apparatus 20 via the LAN cable 22 (step S304). If the type of communication is voice communication (YES in step S303), the response notification output unit 32 of the first communication apparatus 18-1 determines whether or not the number of apparatuses with which the first communication apparatus 18-1 is communicating in an analog manner has reached the predetermined maximum number, for example, one (step S305).

If the number of apparatuses has not reached the maximum number (NO in step S305), the response notification output unit 32 of the first communication apparatus 18-1 outputs a response notification indicating refusal of connection (in this example, a notification in which the value of a response code in the SIP is 488 ("Not Acceptable Here")) to the relay apparatus 20 via the LAN cable 22 (step S304). If the number of apparatuses has reached the maximum number (YES in step S305), the response notification output unit 32 of the first communication apparatus 18-1 outputs a response notification indicating that communication is being performed (in this example, a notification in which the value of a response code in the SIP is 486 ("Busy Here")) to the relay apparatus 20 via the LAN cable 22 (step S306).

The embodiment of the present invention is not limited to the above-described exemplary embodiment.

For example, in the above-described step S205 or S306, the response notification output unit 32 of the first communication apparatus 18-1 may output, to the relay apparatus 20, a response notification different from the response notification indicating that communication is being performed, for example, a response notification that is to be determined, in the arbitration process performed by the arbitration process executing unit 44 of the relay apparatus 20, to have a lower priority than the response notification indicating that communication is being performed.

Alternatively, transmission/reception of information between the communication apparatuses 18 may be performed using a protocol other than the SIP (for example, H.323 or MGCP). Also, the above-described exemplary embodiment may be applied to communication between communication sections 10 connected to a communication medium other than the NGN 12 and the PSTN 14. Furthermore, the above-described exemplary embodiment may be applied to apparatuses other than facsimile apparatuses (for example, telephone apparatuses, streaming distribution apparatuses, etc.).

The above-described specific values and character strings are merely examples, and other values and character strings may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus directly connected to a relay apparatus via a digital communication path and an analog communication path that is provided separately from the digital communication path, the relay apparatus relaying communication performed with a source communication apparatus, the digital communication path being used for communication using a digital communication standard, the analog communication path being used for communication using an analog communication standard, the communication apparatus comprising:
   a communication start request receiving unit that receives, via the digital communication path, a communication start request that is transmitted via the relay apparatus; and
   a response notification output unit that outputs a first response notification or a second response notification to the relay apparatus via the digital communication path when the communication start request receiving unit receives, via the digital communication path, a communication start request for starting communication with the source communication apparatus using the analog communication standard in a case where the number of apparatuses with which the communication apparatus is communicating using the analog communication standard has reached a predetermined number, the first response notification indicating that communication is being performed, the second response notification having a lower priority than the first response notification in an arbitration process of arbitrating the notifications, the arbitration process being executed by the relay apparatus.

2. The communication apparatus according to claim 1, wherein the response notification output unit outputs a third response notification to the relay apparatus via the digital communication path when the communication start request receiving unit receives, via the digital communication path, a communication start request for starting communication using the analog communication standard in a case where the number of apparatuses with which the communication apparatus is communicating using the analog communication standard has not reached the predetermined number, the third response notification indicating refusal of connection.

3. The communication apparatus according to claim 1, wherein the digital communication path comprises digital cable, and the analog communication path comprises an analog cable.

4. The communication apparatus according to claim 3, wherein the digital cable comprises a local area network (LAN) cable, and the analog cable comprises a modular cable.

5. A communication system comprising:
   a source communication apparatus; and
   a destination communication apparatus,
   the source communication apparatus including:
      a communication start request output unit that outputs a communication start request to the destination communication apparatus via a path including a relay apparatus, and
      a response notification receiving unit that receives, via the path including the relay apparatus, a response notification that is output from the destination communication apparatus in response to the communication start request,
   the destination communication apparatus being directly connected to the relay apparatus via a digital communication path and an analog communication path that is provided separately from the digital communication path, the digital communication path being used for communication using a digital communication standard, the analog communication path being used for communication using an analog communication standard, the destination communication apparatus including:
      a communication start request receiving unit that receives, via the digital communication path, a communication start request that is transmitted via the relay apparatus, and
      a response notification output unit that outputs a first response notification or a second response notification to the relay apparatus via the digital communication path when the communication start request receiving unit receives, via the digital communication path, a communication start request for starting communication with the source communication apparatus using the analog communication standard in a case where the number of apparatuses with which the destination communication apparatus is communicating using the analog communication standard has reached a predetermined number, the first response notification indicating that communication is being performed, the second response notification having a lower priority than the first response notification in an arbitration process of arbitrating the notifications, the arbitration process being executed by the relay apparatus.

6. A communication system comprising:
a source communication apparatus;
a destination communication apparatus; and
a relay apparatus,
the destination communication apparatus being directly connected to the relay apparatus via a digital communication path and an analog communication path that is provided separately from the digital communication path, the digital communication path being used for communication using a digital communication standard, the analog communication path being used for communication using an analog communication standard,
the source communication apparatus including:
a communication start request output unit that outputs a communication start request to the destination communication apparatus via a path including the relay apparatus, and
a response notification receiving unit that receives, via the path including the relay apparatus, a response notification that is output from the destination communication apparatus in response to the communication start request,
the relay apparatus including:
a communication start request relay unit that relays a communication start request output from the source communication apparatus to the destination communication apparatus,
an arbitration process executing unit that executes an arbitration process of arbitrating notifications, and
a response notification relay unit that relays a response notification output from the destination communication apparatus to the source communication apparatus,
the destination communication apparatus including:
a communication start request receiving unit that receives, via the digital communication path, a communication start request relayed by the communication start request relay unit, and
a response notification output unit that outputs a first response notification or a second response notification to the relay apparatus via the digital communication path when the communication start request receiving unit receives, via the digital communication path, a communication start request for starting communication with the source communication apparatus using the analog communication standard in a case where the number of apparatuses with which the destination communication apparatus is communicating using the analog communication standard has reached a predetermined number, the first response notification indicating that communication is being performed, the second response notification having a lower priority than the first response notification in the arbitration process executed by the arbitration process executing unit.

7. A non-transitory computer readable medium storing a program causing a computer to execute a process, the computer being connected to a relay apparatus via a digital communication path and a analog communication path that is provided separately from the digital communication path, the relay apparatus relaying communication performed with a source communication apparatus, the digital communication path being used for communication using a digital communication standard, the analog communication path being used for communication using an analog communication standard, the process comprising:
receiving, via the digital communication path, a communication start request that is transmitted via the relay apparatus; and
outputting a first response notification or a second response notification to the relay apparatus via the digital communication path when receiving, via the digital communication path, a communication start request for starting communication with the source communication apparatus using the analog communication standard in a case where the number of apparatuses with which the computer is communicating using the analog communication standard has reached a predetermined number, the first response notification indicating that communication is being performed, the second response notification having a lower priority than the first response notification in an arbitration process of arbitrating the notifications, the arbitration process being executed by the relay apparatus.

* * * * *